Aug. 12, 1930.   R. E. POSPISIL   1,772,911
SUGAR PROCESS
Filed May 19, 1928
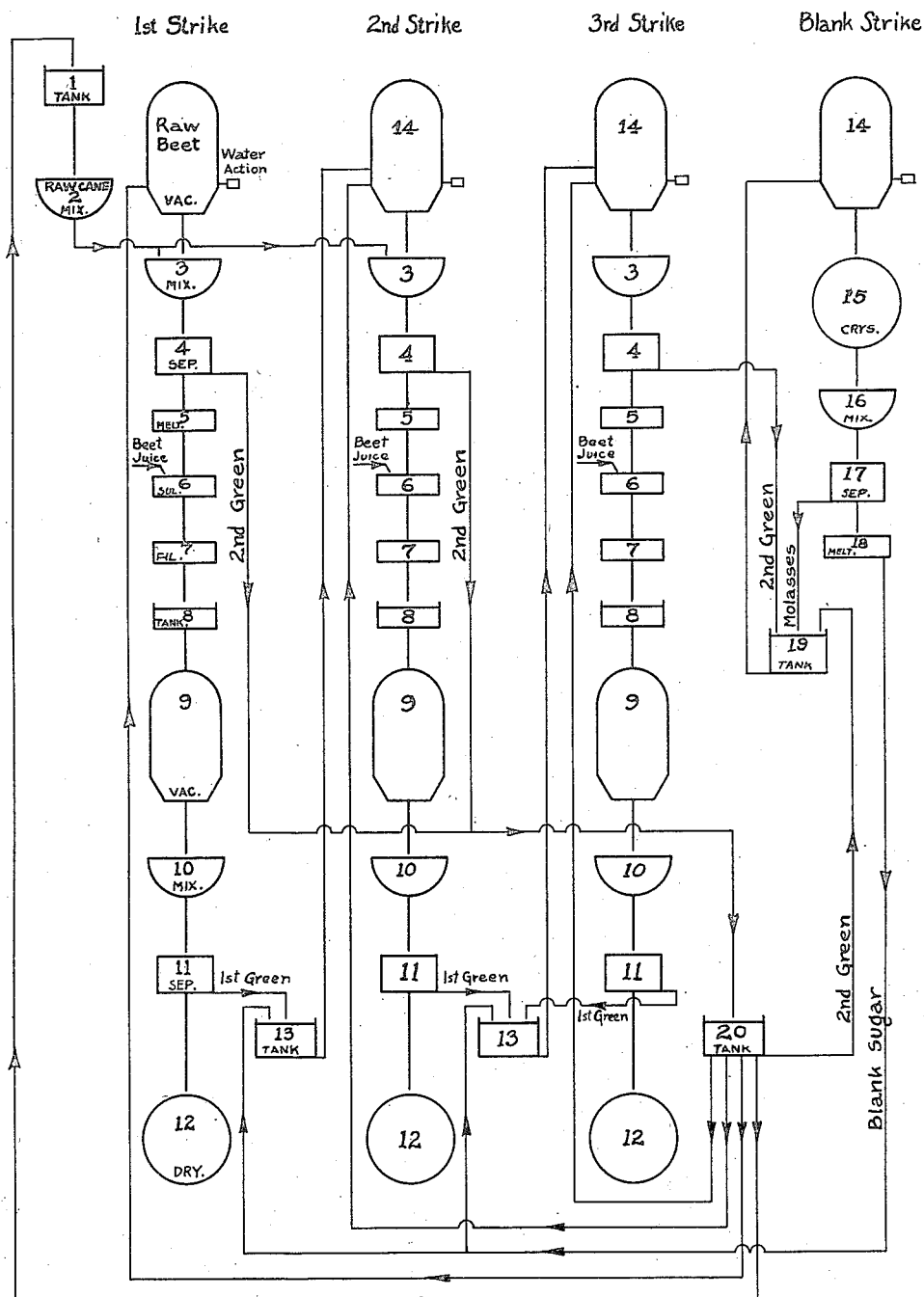

Patented Aug. 12, 1930

1,772,911

UNITED STATES PATENT OFFICE

RUDOLPH E. POSPISIL, OF CHIPPEWA FALLS, WISCONSIN, ASSIGNOR OF ONE-THIRD TO EDMUND KUREK, OF CHIPPEWA FALLS, WISCONSIN

SUGAR PROCESS

Application filed May 19, 1928. Serial No. 279,167.

This invention has for its object to produce granulated sugar without waste from a combination of raw cane sugar and beet juice.

An object of the invention is to amplify the beet sugar process covered by my United States Patent No. 1,352,084 to Pospisil & Kurek, September 7, 1920, by adapting it to operate over an extended season and thereby prolong the "campaign" to extend from one season to the other by working raw cane sugar along with the beet juice.

Another object of the invention is to produce white granulated sugar from raw cane without the necessity for the use of expensive bone filters usually employed in the refining of cane sugar.

With the above and other objects in view the invention consists in the sugar process as herein claimed and all equivalents.

Reference will be made to the accompanying drawing, which is a diagram of the process of this invention representing the several strikes by lines connecting various mechanisms in the order that the material in its various stages travels through them.

For obtaining the first strike of white granulated sugar, second green syrup obtained from a later stage in the process and contained in a tank 1 is drawn into the mixer 2 containing raw cane sugar and is mixed therewith to render it more suitable for working, but is not thinned to an extent that would affect the raw cane crystals. This massecuite is pumped to the mixer 3, where it meets high raw beet massecuite from vacuum pan 14 corresponding with one of the vacuum pans of the said patent using water action to expel impurities and raise the purity of the massecuite. The cane massecuite and the beet massecuite are mixed together in mixer 3 and pass through a centrifugal separator 4 and the pure crystals testing 98 purity are melted in melter 5 to 30° Baumé and then pumped to sulphur station 6, where fresh beet juice is added. These are mixed together and bleached and neutralized and then pass through mechanical filters 7 and into tank 8, from which they are drawn into vacuum tank 9 and boiled to a massecuite. This massecuite is dropped into mixer 10 and then into centrifugal separator 11, where it is washed with pure water and the crystals are then dried in drier 12 to produce the first strike pure granulated white sugar. The second green syrup from centrifugal separator 4 is pumped to the tank 20, to be used for the next raw strike and the first green syrup from centrifugal separator 11 is collected in the tank 13 to be used in the second strike.

For obtaining the second strike white granulated sugar green syrup is pumped from tank 13 into vacuum pan 14, together with blank sugar from the last strike of the process and also second green syrup from tank 20. This first green syrup and the blank strike sugar from tank 13 and the second green syrup from tank 20 are mixed together in syrup in vacuum pan 14 to form crystals and boiled to massecuite with rapid water injections. This massecuite is dropped to mixer 3, where raw cane sugar from mixer 2 is added and mixed therewith. The mixed massecuite of raw cane sugar and of the combination of beet and raw cane sugar are passed through the centrifugal separator 4 and the crystals of 98 purity are melted in melter 5 to 30° Baumé and then pumped to sulphur station 6 where fresh beet juice is added and they are mixed together and bleached and neutralized and then passed through mechanical filter 7 and pumped to tank 8. From here the material is drawn to vacuum pan 9 and boiled to a massecuite which is dropped to mixer 10 and then through centrifugal separator 11 where it is washed with pure water and the crystals are dried in drier 12 to produce pure granulated white sugar which completes the second strike.

The first green syrup from the second strike and sugar from the blank strike will meet together in tank 13 and be pumped to vacuum pan 14 for the third strike. There is also pumped to this vacuum pan from tank 20 the second green syrup from the first and second strikes. These syrups are boiled together in the vacuum tank 14 and are subjected to the water injection repeatedly until the massecuite is finished and it is then dropped into the mixer 3 and passed through the centrifugal separator 4 and then to the melter 5 to be melted to 30° Baumé. It is then pumped to the sulphur station 6 to meet fresh beet juice and is bleached and neutralized and passed through the mechanical filter 7 and into tank 8, from which it is drawn to the vacuum pan 9 to be boiled to massecuite and dropped into the mixer 10. It then passes through the centrifugal separator 11 to wash the crystals and they are dried in drier 12 to complete the third strike of white sugar.

The first green syrup from the third strike is collected in tank 13 while the second green syrup together with second green syrup from tank 20 is pumped to a tank 19 from which it is drawn into vacuum pan 14 for the blank strike. Here it is boiled to a purity of 93° to 94° Brix. This massecuite is dropped into crystallizers 15 to remain for approximately five days to be crystallized and it is then dropped into mixer 16 and then through the centrifugal separator 17 to separate the crystals which are melted in melter 18 to 30° Baumé, to constitute the blank sugar conducted to tank 13 to meet the first green syrup for use in the second and third strikes. This blank sugar is dark and is repeatedly melted and continually boiled over again for high raw massecuite. The molasses from the blank strike is drawn into tank 19 where it meets with the second green syrup from the third strike and with the second green syrup from the first and second strikes, from the tank 20, and this mixture is boiled in vacuum pan 14 to repeat the blank strike again and again, the purity of the molasses being raised by the addition of the green syrup to permit the recovery of additional blank sugar to be worked into the process for producing white granulated sugar as described.

By means of this process, white sugar alone of high quality is produced from a mixture of raw cane sugar and beet juice, without a loss by way of comparatively valueless by-products and without expensive steps such as the bone filtering necessary with the refining of cane sugar in the usual way.

The treatment together of raw cane sugar and beet juice makes it possible to extend the campaign from season to season without a loss of machinery that was incident to the brief operation of only a few weeks each year with beets alone. The raw cane sugar is available on the market at all times and by combining it with the beets, the sugar making campaign may be extended to a continuous operation from one beet crop to the next.

It will be noted that the successive steps are substantially alike for obtaining white granulated sugar in the three strikes and as this succession of steps is more or less standard practice and as such forms no part of the present invention but may be varied as recognized by those skilled in the art, the term "treating a mixture to recover white sugar" and the term "obtaining a strike of sugar" as employed in the claims are intended to include such a succession of steps and the recognized equivalents, thus avoiding the necessity for reciting the successive steps wherever a strike is mentioned.

What I claim as new and desire to secure by Letters Patent is:

1. The process of making white granulated sugar which consists in treating raw beet juice to recover a massecuite therefrom, mixing raw cane sugar with such massecuite and treating this mixture to recover white sugar.

2. The process of making white granulated sugar which consists in treating raw beet juice to recover a massecuite therefrom, mixing raw cane sugar with such massecuite and treating this mixture to recover first strike white sugar, boiling in a vacuum pan the syrups from the first strike and a part of the dark sugar from the blank of a later strike, subjecting the same to water injections to remove impurities, separating the crystals from the syrup, melting them and boiling the melted crystals in the vacuum pan to a massecuite and recovering the crystals therefrom.

3. The process of making white granulated sugar which consists in treating raw beet juice and raw cane sugar to recover the first strike of white sugar therefrom, boiling in a vacuum pan the syrups from the first strike and a part of the dark sugar from the blank of a later strike, mixing raw cane sugar therewith and melting and boiling them to a massecuite and recovering the crystals therefrom.

4. The process of producing white granulated sugar which consists in obtaining a first and second strike of sugar from a mixture of raw beet massecuite and raw cane sugar, boiling in a vacuum pan syrups from the first and second strikes to form crystals, separating the crystals and melting and bleaching them and adding raw juice thereto and then boiling the mixture in a vacuum pan and recovering sugar therefrom.

5. The process of producing white granulated sugar which consists in obtaining three strikes of sugar from a mixture of raw beet massecuite and raw cane sugar, boiling in a vacuum pan the second green syrup of the third strike and a part of the second green syrup of the first and second strike to form blank, treating the massecuite in crystallizers to recover dark sugar crystals and returning them to the first green syrup of the first and second strikes for use in the second and third strikes.

6. The process of claim 5 wherein the molasses of the blank strike is added to the second green syrup of the first, second and third strikes to be again run through another blank strike.

In testimony whereof I affix my signature.
RUDOLPH E. POSPISIL.